…

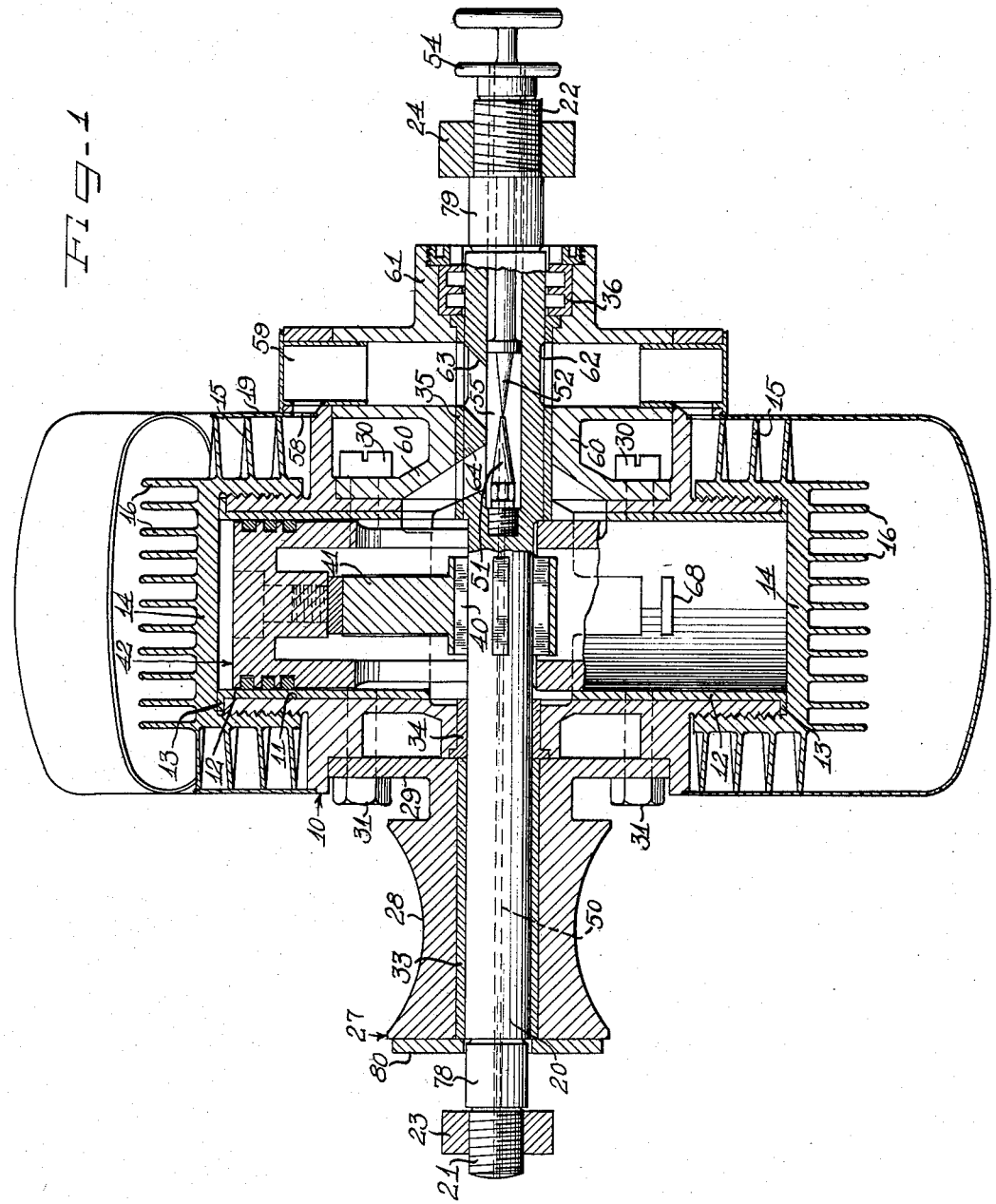

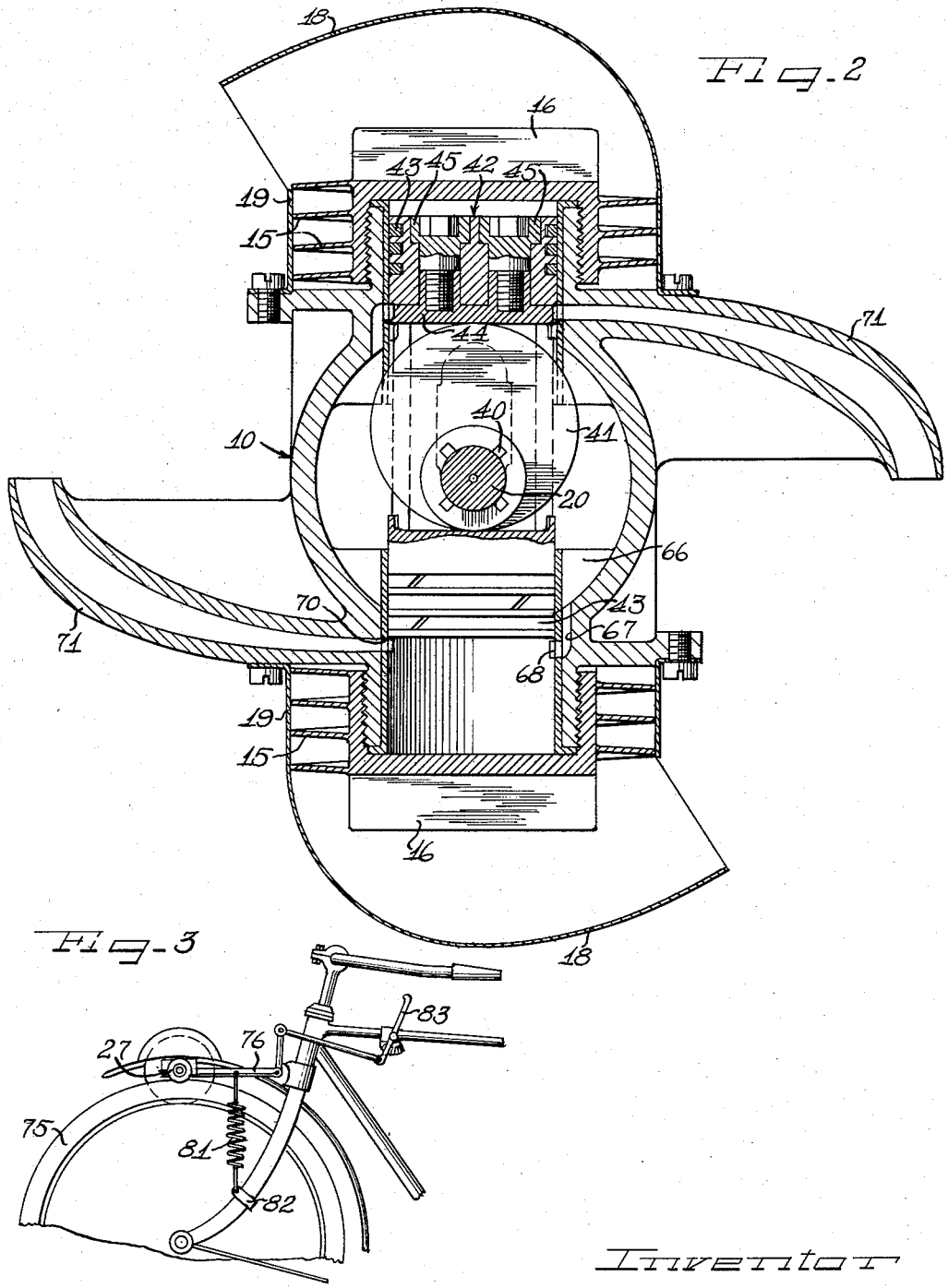

United States Patent Office

2,718,752
Patented Sept. 27, 1955

2,718,752

INTERNAL COMBUSTION ENGINE

Hans Rohrbach, Geneva, Switzerland, assignor of one-third to Joe Reilly, Elmhurst, and one-third to Otto Brennemann, Bartlett, Ill.

Application January 2, 1951, Serial No. 203,856

9 Claims. (Cl. 60—13)

The present invention relates to an internal combustion engine characterized by its high efficiency and the simplicity of construction.

The engine of the present invention contains no ignition system, flywheels, connecting rods, mufflers, superchargers or compressors and yet is capable of high speed rotation and high torque output.

The internal combustion engine of the present invention includes a stationary shaft carrying an eccentric cam, with a rotatable housing journaled for rotation about the shaft. The housing carries a plurality of cylinder sleeves in which pistons are arranged to reciprocate. The pistons coact with the stationary cam to effect rotation of the housing, in the manner of a flywheel.

The engine of the present invention contains an especially designed air intake system which serves not only to cool the cylinder head, but at the same time pre-heats the air and injects the pre-heated air into a fuel mixing chamber under substantial pressure. The amount of pre-heat given to the air is sufficient to vaporize the fuel in the fuel mixing system and, upon compression of the fuel-air mixture in the cylinder head, to ignite the fuel-air mixture during the power stroke.

Another feature in the present engine resides in a special exhaust system wherein the exhaust gases are vented to minimize vibration and thereby minimize the exhaust noises.

An object of the present invention is to provide a lightweight, high efficiency, internal combustion engine.

Another object of the present invention is to provide an air intake system for an internal combustion engine wherein atmospheric air is directed around the cylinder head to thereby cool the cylinder walls while transferring the heat to the incoming air prior to its injection into the fuel-air mixing chamber.

Another object of the present invention is to provide a simple, high speed engine capable of high speed rotation and high torque output.

Another object of the present invention is to provide an exhaust system for an internal combustion engine to minimize the exhaust noises and thereby eliminate the necessity for engine mufflers.

Still another object of the present invention is to provide an internal combustion engine which may be easily assembled and disassembled and in which the replacement of worn parts is facilitated.

The present invention will best be understood from a consideration of the attached sheets of drawings in which:

Figure 1 is a cross-sectional view of the engine, with parts in elevation;

Figure 2 is a cross-sectional end view of the engine shown in Figure 1, with parts in elevation; and Figure 3 is a fragmentary view of a bicycle to which the engine of the present invention is attached.

As shown on the drawings:

Reference numeral 10 denotes generally a substantially hollow housing having a transverse bore 11 extending therethrough. Disposed within the bore 11 are a pair of cylinder sleeves 12, each of the sleeves 12 having an annular end portion 13 which is bottomed against an end of the housing 10. Additional securing means, such as small set screws (not shown) can be employed to hold the cylinder sleeve 12 in correct axial alignment within the bore 11 of the housing 10.

For the sake of simplicity, the engine illustrated in the drawings includes only two cylinders, but it will be appreciated that the principles involved in the engine will be just as applicable to engines having larger numbers of cylinders.

Each end of the housing 10 is provided with a cap 14 in threaded engagement therewith. Each of the caps 14 has a set of helically arranged fins 15 to define air passages for incoming air to thereby cool the housing 10 in the vicinity of the cylinder sleeve 12.

In addition to the helically arranged fins 15 at the sides of the caps 14, a plurality of substantially parallel heat directing fins 16 are provided at the ends of the caps 14.

A specially designed air inlet means including an arcuately shaped air inlet portion 18 has a cylindrical wall portion 19 which substantially encloses the helical fins 15, thereby confining the path of the air introduced through the air inlet portion 18 to the helical passages between the fins 15. The air scoop portion 18 is arranged to receive air along the line of rotation of the housing 10. Since the housing 10 will normally rotate at an extremely high velocity, on the order of 7000 to 8000 R. P. M., the atmospheric air is forced around the fins 15 at a substantial pressure and at a relatively high velocity.

The housing 10 is journaled for rotation about a stationary shaft 20 which has threaded portions 21 and 22 receiving retaining nuts 23 and 24 to hold a clamping means along exposed portions 78 and 79 of the shaft 20.

The housing structure also includes a friction wheel 27 having a concave engaging surface 28 for frictionally engaging the rim of a wheel, for example, a bicycle wheel, to which the torque of the engine is to be supplied. The friction wheel 27 is secured to the housing 10 through the provision of a flange portion 29 which is held in place against the housing 10 by means of a plurality of bolts 30 and their associated nuts 31.

Spaced along the stationary shaft 20 are a plurality of bearing sleeves, including sleeves 33 and 34 and an apertured bearing sleeve 35, the purpose of which will be hereinafter more fully described. A sealing gasket 36 is also provided at one end of the shaft 20.

The shaft 20 also carries a plurality of keys 40 which engage keyways in an eccentric cam 41 and hold the cam 41 in fixed position along the shaft 20.

The cam 41 is arranged to coact with a specially designed piston 42 to cause reciprocation of the piston 42 within the cylinder sleeve 12. The structure of the piston itself is perhaps best illustrated in Figure 2. As illustrated, the piston 42 is essentially a double-ended hollow piston, both ends of which contain conventional piston rings 43, the ends of the piston being arranged to reciprocate in their associated cylinder sleeves 12. The interior of the piston 42 includes a wearplate 44 held within the piston head by means of bolts 45. The wearplate 44 is preferably composed of a hardened and polished material so that it can withstand a large amount of wear occasioned by rotation of the wearplate 44 against the surface of the cam 41.

Fuel is introduced into the engine through a small diameter bore 50 along the axis of the shaft 20 (Figure 1). The fuel then passes through a nozzle 51 which is threaded into the base of an axial recess provided at the opposite end of the shaft 20. The control of the composition of the fuel-air mixture may be had by adjustment of a needle valve 52 whose penetration into the nozzle 51 may be controlled by a knob 54. The nozzle 51 and the needle valve 52 are located in a fuel-air mixing chamber 55 and serve to introduce variable amounts of fuel into the pre-heated air directed around the heat transferring fins 15.

As the incoming air is drawn through the air scoop 18 and caused to circulate in a helical path about the cap 14, the air is not only heated by the high temperatures present along the cap 14 but also is subjected to substantial pressure due to the high peripheral velocity of the air scoop 18 and the fact that the air is being confined into relatively small passageways. Such heated air under pressure then passes through a port 58 formed in the cylindrical wall 19 and then into an air inlet chamber 59. This chamber 59 is formed in a housing including a flange portion 60 which is rigidly held to the housing 10 by means of the bolt 30. The housing also includes a hub portion 61 which encloses the sealing gasket 36.

The air under pressure passing through the chamber 59 next flows through the shaft 20 by virtue of an annular recess 62 provided in the shaft 20. An inlet bore 63 is also formed in the shaft to permit the heated air to flow from the space defined by the recess 62 into the mixing chamber 55. In the chamber 55 the pre-heated air and the fuel injected by the nozzle 51 are mixed to form a fuel-air mixture whose composition is regulated by the setting of the needle valve 52.

The fuel-air mixture passes from the mixing chamber 55 through a port 64 and through a registering aperture formed in the bearing sleeve 35. The fuel-air mixture then passes into the crankcase portion of the engine, indicated generally at numeral 66 (Figure 2). The housing 10 is recessed, as indicated at 67, in the vicinity of the cylinder sleeve to permit flow of the fuel-air mixture from the crankcase 66 into an inlet port 68 formed in the sleeve 12 at a point below the piston head 42 when the piston located in that sleeve is in its intake position, as illustrated in Figure 2.

As the double-ended piston reciprocates within the cylinder sleeve 12 by the rotation of the housing 10 about the axis of the shaft 20, the piston head compresses the fuel-air mixture at the base of the cylinder. The heat content of the fuel-air mixture is sufficient to cause ignition of the mixture during the compression stroke, thereby forcing the piston in its power stroke against eccentric cam 41.

As the cycle is completed, exhaust gases are vented from the combustion chamber through an exit port 70 formed in the cylinder sleeve 12.

The exhaust gases are finally vented to the atmosphere through a pair of exhaust chambers 71. As seen in Figure 2, these exhaust chambers 71 are integral with the housing and have an arcuate shape such that the gases passing therethrough are directed substantially along the line of rotation of the housing 10. Because of the extremely high peripheral speed of the engine, the speed of the exhaust gases is only very slightly higher than the actual speed of rotation of the engine parts themselves. This slight additional speed, however, develops a sufficient thrust to overcome the resistance developed by the air scoops 18. However, the speed differential is not sufficiently large to cause vibration so that the amount of sound caused by the exhaust is minimized.

The means for attaching the engine of the present invention to operate a bicycle are illustrated in Figure 3. As there shown, the friction wheel 27 may be held against the rim of the bicycle wheel 75 by means of a pair of rigid connecting arms 76 provided with suitable clamping means for embracing the exposed portions 78 and 79 of the shaft 20. The friction wheel 27 is prevented from rapid disintegration by means of a wear plate 80 of a material such as bronze which abuts the clamping means on the arm 76.

The friction wheel 27 is biased into engagement with the rim of the tire 75 by means of a spring 81 which is anchored upon a bracket 82 on the fork of a bicycle frame.

To permit raising and lowering of the engine from against the rim of the bicycle wheel, a friction release lever 83 is provided. Manipulation of the lever 83 raises and lowers the friction wheel 27 against the rim 25, as desired, against the action of spring 81.

The engine is started with the fuel supply shut off. Control of fuel flow into the axial bore 50 may be had by means of a suitable hand-operated valve (not shown). As the friction wheel 27 is rapidly rotated by contact with the bicycle wheel, the high compression produced by the engine causes the engine to warm up quickly. After a few minutes the fuel valve may be opened to introduce fuel into the system, whereupon the engine commences high speed rotation at once.

From the foregoing it will be apparent that I have herein provided a simple yet highly efficient internal combustion engine. Through the use of the specially designed air inlets, the incoming air is pre-heated by contact with the cylinder walls and is forced under pressure into a fuel-air mixing chamber. Upon introduction of the fuel-air mixture into the combustion chamber, the heat carried by the air is sufficient to cause auto-ignition of the mixture, thereby eliminating the necessity of employing conventional ignition systems.

In addition, the rapid speed of rotation of the engine causes efficient mixing of the fuel charge with the air prior to its introduction to the combustion chamber.

The exhaust system in the engine is particularly important since it provides a means for exhausting the burned gases efficiently without the production of vibrations leading to objectionable noises.

It will be understood that various modifications and variations may be effected without departing from the scope of the novel concepts of the present invention.

I claim as my invention:

1. In an internal combustion engine including a rotatable housing, a stationary shaft journaled by said housing, a cam carried by said shaft, a cylinder carried by said housing, a piston arranged to be engaged by said cam to reciprocate within said cylinder upon rotation of said housing, a fuel-air mixing chamber communicating with said cylinder to introduce a fuel-air mixture therein, air directing means disposed about the wall of said cylinder, and an air inlet means including a curved air scoop having its inlet portion substantially tangential to the line of rotation of said housing, whereby incoming air is directed by said air inlet means along said air directing means prior to introduction of said air into said fuel-air mixing chamber.

2. In an internal combustion engine including a rotatable housing, a stationary shaft journaled by said housing, a cam carried by said shaft, a cylinder carried by said housing, a piston arranged to engage said cam to reciprocate within said cylinder upon rotation of said housing about said shaft, a fuel-air mixing chamber communicating with said cylinder to introduce a fuel-air mixture therein, air directing means disposed about the walls of said cylinder, and an air inlet means including a curved air scoop having its inlet portion substantially tangential to the line of rotation of said housing, whereby incoming air is directed by said air inlet means along said air directing means prior to introduction of said air into said fuel-air mixing chamber, and an exhaust formed in said housing and communicating with said cylinder, said exhaust being curved to vent exhaust gases substantially along the line of rotation of said housing.

3. In an internal combustion engine including a rotatable housing, a stationary shaft journaled by said housing, a cam carried by said shaft, a cylinder carried by said housing, a piston arranged to engage said cam to reciprocate within said cylinder upon rotation of said housing, a fuel-air mixing chamber communicating with said cylinder to introduce a fuel-air mixture therein, air directing means comprising helical fins disposed about the wall of said cylinder, and an air inlet means including a curved air scoop having its inlet portion substantially tangential to the line of rotation of said housing, whereby incoming air is directed by said air inlet means along said air directing means prior to introduction of said air into said fuel-air mixing chamber, and an exhaust formed in said housing and communicating with said cylinder, said exhaust being curved to vent exhaust gases substantially along the line of rotation of said housing.

4. An internal combustion engine comprising a rotatable housing having an axial bore therethrough, a pair of cylinder sleeves held within opposite ends of said bore, a pair of caps secured to opposed ends of said housing, said caps having helical fins extending along said housing axially of said cylinder sleeves and a pair of air inlet ducts secured to said housing and enclosing the edges of said fins to provide a helical path for air received by said ducts along said fins to thereby cool said housing in the regions of said cylinder sleeves.

5. An internal combustion engine comprising a rotatable housing having an axial bore therethrough, a pair of cylinder sleeves held within opposite ends of said bore, a pair of caps secured to opposed ends of said housing, said caps having helical fins extending along said housing axially of said cylinder sleeves, and a pair of arcuately shaped air inlet ducts having inlet portions arranged to receive air along the line of rotation of said housing, said ducts being secured to said housing along said fins to thereby cool said housing in the regions of said cylinder sleeves.

6. An internal combustion engine comprising a rotatable housing having an axial bore therethrough, a pair of cylinder sleeves held within opposite ends of said bore, a pair of caps secured to opposed ends of said housing, said caps having helical fins extending along said housing axially of said sleeves and spaced parallel fins at the ends of said caps, and a pair of inlet ducts secured to said housing and enclosing the edges of said first fines to provide a helical path for air received by said ducts along said fins to thereby cool said housing in the region of said cylinder sleeves.

7. An internal combustion engine comprising a rotatable housing, a stationary shaft journaled by said housing, a cylinder carried by said housing, a piston reciprocable in said cylinder, a fuel-air mixing chamber communicating with said cylinder to introduce a fuel-air mixture therein, an air scoop carried by said housing, said air scoop having an inlet portion substantially tangential to the path of rotation of said housing, and means associated with said cylinder to receive air from said air scoop and arranged to direct air about said cylinder and then into said fuel-air mixing chamber.

8. An internal combustion engine comprising a rotatable housing, a stationary shaft journaled by said housing, a cylinder carried by said housing, a piston reciprocable in said cylinder, a fuel-air mixing chamber communicating with said cylinder to introduce a fuel-air mixture therein, an air scoop carried by said housing, said air scoop having an inlet portion substantially tangential to the path of rotation of said housing, means associated with said cylinder to receive air from said air scoop and arranged to direct air about said cylinder and then into said fuel-air mixing chamber, and exhaust means carried by said housing, said exhaust means being curved to vent exhaust gases substantially tangential to the path of rotation of said housing.

9. An internal combustion engine comprising, a stationary shaft, a housing rotatably mounted on said shaft, a cylinder carried by said housing, a piston reciprocable in said cylinder and caused to reciprocate therein by relative movement between said shaft and said housing, a fuel-air mixing chamber communicating with said cylinder to introduce a fuel-air mixture therein, an air scoop carried by said housing, said air scoop having an inlet portion substantially tangential to the path of rotation of said housing and acting as a positive scoop in the direction of rotation of said housing relatively to said shaft, and means for directing air from said scoop about said cylinder and from thence into said fuel-air mixing chamber, said scoop providing a source of air under a positive pressure for mixture with the fuel in said mixing fuel-air mixing chamber.

References Cited in the file of this patent

UNITED STATES PATENTS

| | | |
|---|---|---|
| 852,033 | Phillipe | Apr. 30, 1907 |
| 1,203,767 | Moore | Nov. 7, 1916 |
| 1,509,885 | Trebert | Sept. 30, 1924 |
| 1,542,448 | Harper | June 16, 1925 |
| 1,612,046 | Owens | Dec. 28, 1926 |
| 2,334,561 | Kopplin | Nov. 16, 1943 |
| 2,533,487 | Mauer et al. | Dec. 12, 1950 |

FOREIGN PATENTS

| | | |
|---|---|---|
| 12,503 | Great Britain | Sept. 19, 1884 |
| 113,158 | Great Britain | Feb. 14, 1918 |
| 267,689 | Great Britain | Mar. 24, 1927 |
| 113,748 | Germany | Sept. 24, 1900 |
| 359,750 | Germany | Sept. 26, 1922 |
| 874,198 | France | Apr. 20, 1942 |